Oct. 14, 1952     L. E. TORREY     2,614,007
DRILL PRESS
Filed April 10, 1947

INVENTOR.
Lee E. Torrey
BY
Harness, Dickey & Pierce
ATTORNEYS.

Patented Oct. 14, 1952

2,614,007

UNITED STATES PATENT OFFICE 2,614,007

DRILL PRESS

Lee E. Torrey, Ypsilanti, Mich., assignor to King-Seeley Corporation, Ann Arbor, Mich., a corporation of Michigan Application April 10, 1947, Serial No. 740,607

6 Claims. (Cl. 308—189)

This invention relates generally to drill presses and more particularly to a drill press pulley construction and mounting.

The principal objects of this invention are to provide a drill press pulley having an integral depending sleeve-like hub which receives and is splined to the drill press spindle; to provide vertically spaced bearings, for journaling said pulley sleeve-like hub in the drill press head, which bearings are held against axial movement with respect to the sleeve so as to form with the pulley and sleeve a unitary assemblage which is applicable to and removable from the head as such; to provide means co-operating between the head and such assemblage which is accessible exteriorly of the head so that the pulley and bearings can be secured to and released from said head as a single unit; to provide a drill press pulley having a depending sleeve-like hub, for receiving the drill press spindle, and which is splined to the spindle adjacent its lower end so that the upper end of said spindle will not project substantially above the upper end of the pulley when it is in its uppermost position; to provide generally an inexpensive and yet unusually accurate drill press pulley construction which can be quickly removed from the drill press head, and which is especially rugged and durable in operation.

Figure 1:
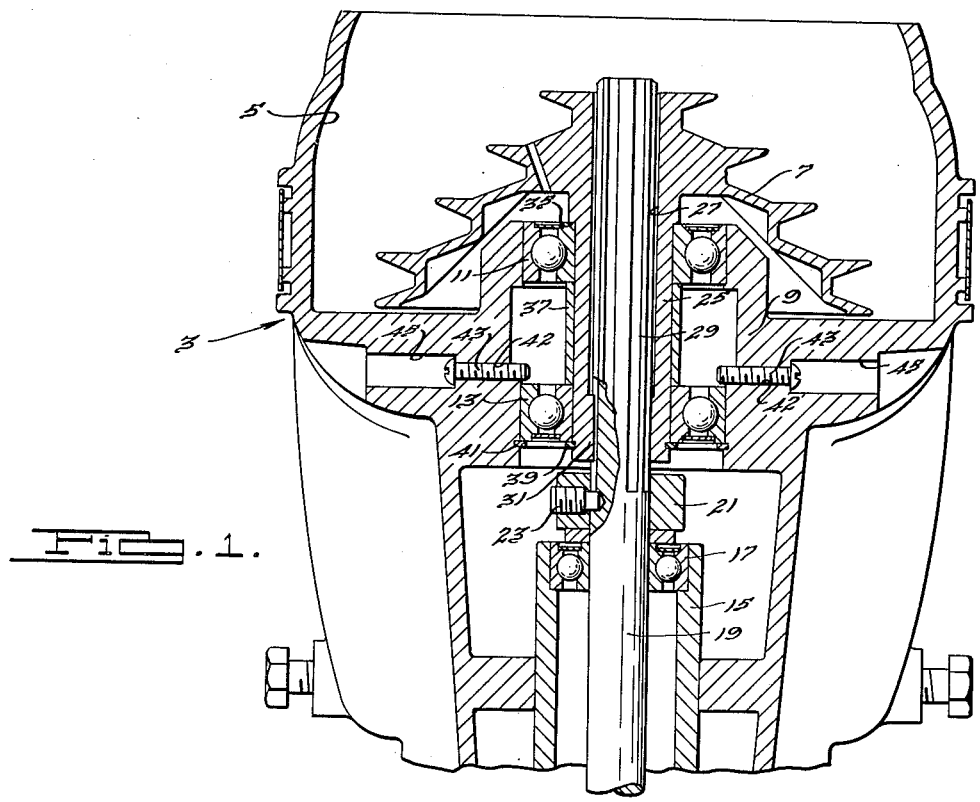
Figure 2:
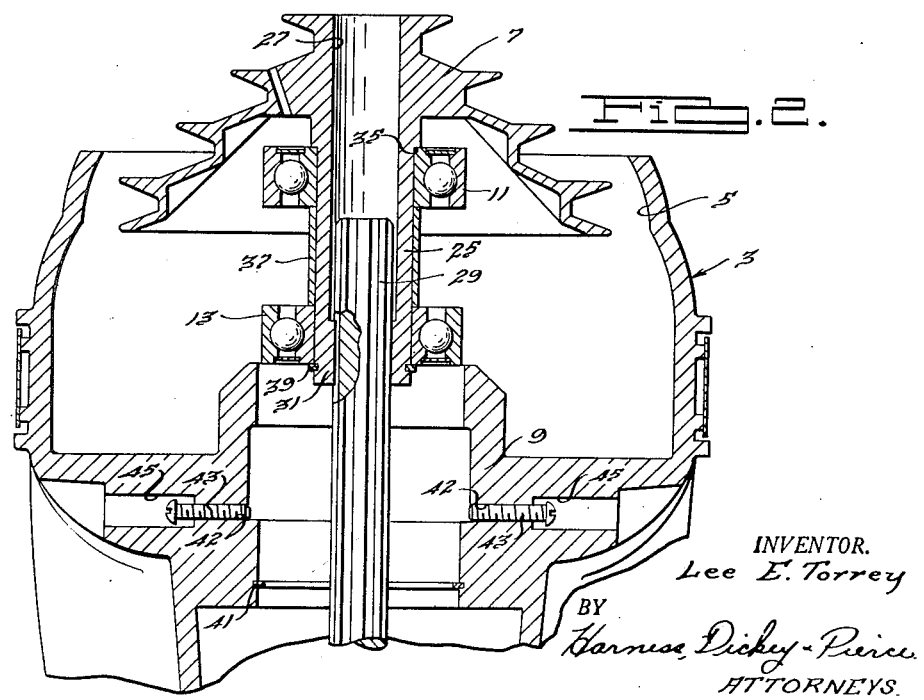

These and other objects of this invention will become apparent from the following detailed description taken in conjunction with the accompanying drawing in which:

Figure 1 is a fragmentary sectional view of a portion of a drill press head embodying this invention; and Figure 2 is a sectional view similar to Figure 1 illustrating the pulley in a partially removed position.

Referring now to the drawing, a cast drill press head is indicated at 3, the upper end of which is open as at 5 for receiving a multi-groove V-belt pulley 7 of generally conical conformation therein. The pulley 7 is connected by a belt, or the like, to drive means, such as an electric motor for driving the drill press spindle and chuck at various speeds. The head 3 has a hollow, vertically elongated boss 9 formed adjacent the upper end thereof for receiving bearings for the pulley bearing means, and while in the broader aspects of the invention either plain or anti-friction bearing means may be employed, in the case shown by way of illustration vertically spaced bearings 11 and 13 are provided for rotatably journaling the pulley 7 in a manner which will be hereinafter described in detail.

A conventional vertically movable quill 15 is slidably received in the head 34 and is provided interiorly at its upper end with a bearing 17 for journaling a spindle 19 therein. A collar 21 is provided on the spindle 19 for engaging the upper surface of the bearing 17, and the collar is held in position by means of a set screw 23, so that the quill and spindle will axially reciprocate as a unit.

The pulley 7 is provided with a central, depending sleeve-like hub 25 which is fixed and preferably integral therewith. The hub 25 has an axial bore 27 which freely receives the upper splined end 29 of the spindle 19. The lower end of the hub bore 27 is reduced in diameter and internally splined as at 31 to engage the splined upper end 29 of the spindle and provide a driving connection between the spindle and the pulley 7. The splined portion 31 of the pulley hub 25 is preferably formed on the extreme lower end of the hub 25 so that the upper end of the axially movable spindle, when in its uppermost position, will not project substantially beyond the upper end of the pulley 7. Thus, by having the sleeve hub 25 fixed or formed integrally with the pulley, the outer diameters of the pulley and the bore of the hub 25 can be machined so as to insure concentricity therebetween, in a relatively inexpensive manner.

The sleeve-like pulley hub 25 is rotatably supported in the head 3 by the previously mentioned vertically spaced bearings 11 and 13. The bearings 11 and 13 have the inner recess thereof mounted on the pulley hub 25 in such a manner that no axial movement therebetween can occur and so that the pulley 7 and the bearings 11 and 13 may be withdrawn, or pulled upwardly out of the head 3, as a single unit, as illustrated in Fig. 2. This is accomplished by assembling the bearings 11 and 13 on the pulley hub 25 in the following manner. The upper bearing 11 is first positioned on the hub 25 so that its inner race abuts against a shoulder 35 formed adjacent the upper end of the hub. A spacer sleeve 37 is then positioned around the hub so that its upper end is in an abutting relation with the underside of the inner race of the bearing 11. The lower bearing 13 is then positioned on the hub 25 with the upper surface of its inner race abutting the lower end of the sleeve 37. A snap ring 39 is received on the lower end of the hub so as to abut the underside of the inner race of the bearing 13 and hold the bearings 11 and 13 in a fixed relation on the hub. The pulley 7 and its associated bearings 11 and 13 thus provide a small complete sub-assembly, which can be easily handled and which can be easily assembled in the head 3 as a complete unit so as to eliminate the operations of placing the bearings in the head separately from the hub and pulley, and then inserting the pulley as a separate part. Therefore the manufacturing costs are substantially reduced.

Any suitable means may be provided adjacent the lower end of the bore of the boss 9 to act as a stop for limiting the downward movement of the bearings and pulley within the head 3, such as a stepped shoulder, split ring or the like. Preferably, in order to keep manufacturing costs at a minimum, a snap ring 41 is shown in the drawing as inserted in the lower end of the boss 9 of the head 3 so that when the pulley and bearings are inserted into the bore of the boss, the underside of the outer race of the bearing 13 will be limited in its downward movement by the snap ring 41.

In accordance with the present invention readily accessible means, preferably accessible from an outer face of the head 3, is or are provided for holding the sleeve-like hub 24 against inadvertent withdrawal from the head. Such means are such that when released or removed the pulley 7 and hub 25 may be withdrawn as a unit upwardly from the head. In the particular case shown here, the bearing assemblies 11 and 13 form a unit with the pulley 7 and sleeve 25 and are therefore required to be withdrawn with them but, at the same time, form a means whereby the above described result may be readily obtained. Accordingly, in this case, in order to hold the bearings and pulley in their proper position in the head 3, opposed transversely extending screws 43 are threadably received in the head, the inner ends of which abut the upper surface of the outer race of the bearing 13. The bearing 13 is thus prevented from moving axially with respect to the head 3 by means of the snap ring 41 and the screws 43. The screws 43 are exteriorly accessible from the head due to transversely extending recesses 45 which extend outwardly through the head from the tapped apertures 42, in which the screws 43 are threadably received.

In order to remove the pulley 7 and the bearings 11 and 13 from the head 3 a suitable tool, such as a screwdriver, is inserted into each recess 45 and each screw 43 is then backed-off sufficiently to permit the axial withdrawal of the bearings and pulley from the head. As the outer race of each of the bearings 11 and 13 is only a light press fit in the bore of the boss 9, the pulley and bearings can be easily removed by upward pressure applied to the pulley 7.

It will therefore be seen that a pulley construction is provided which is especially inexpensive to manufacture and which can be easily disassembled from the head in order to replace any damaged or worn out parts.

What is claimed is:

1. In a drill press or the like having a rotary drive spindle, the combination of a stationary support having an aperture therein through which the spindle passes, a drive head for the spindle comprising a pulley having an annular belt-engaging surface and a hub extending axially therefrom, said head having a spindle-receiving and -driving bore extending through the pulley and hub, means whereby the hub may be rotarily mounted in the support aperture comprising an axially spaced pair of roller-bearing structure including inner races mounted on the hub and outer races mounted in the aperture and rolling elements between the races, a spacer on the hub axially spacing the bearing structures, a first radial shoulder on the head adjacent the pulley for engagement with the race of a bearing structure to axially position the same, radial shoulder means on the sleeve engaging the race of a bearing structure and confining the bearing structures and spacer between the radial shoulders, said radial shoulder means being removable and the outer end of the hub remote from the pulley being of such diameter that the bearing structures and spacer may be axially moved on the hub over the end thereof and thus removed and disassembled from the head or alternatively may be installed and confined on the hub between the first radial shoulder and the removable shoulder means to thus provide a unitary assembly of head and bearing structures and spacer, said radial shoulder means comprising a groove in the hub and a snap ring in said groove, and releasable thrust-receiving means on the support extending partially across the aperture for selectively retaining the head and bearing structures in fixed axial position relative to the support or upon release allowing the assembly of head and bearing structure to be moved in the aperture, said thrust-receiving means comprising a pair of axially spaced radial shoulders, the thrust shoulder nearer the pulley comprising a radial member movably engaged with the support and operatively accessible from the outer surface of the support when the entire head is mounted thereon, the thrust shoulder remote from the pulley comprising a groove in the support aperture and a snap ring in the groove engaging the bearing structure remote from the pulley on a radial face remote from the pulley, the thrust radial member engaging the race of the bearing structure remote from the pulley on the radial face nearer the pulley.

2. In a drill press or the like having a rotary drive spindle, the combination of a stationary support having an aperture therein through which the spindle passes, a drive head for the spindle having a hub extending axially therefrom, said head having a spindle-receiving and -driving bore extending through the hub, means for rotarily mounting the head on the support with the hub in said aperture comprising axially spaced first and second ball-bearing structures each including an inner race mounted on the hub and an outer race mounted on the wall of the support aperture, a spacer on the hub for axially spacing the bearing structures, a first radial shoulder on the head for engagement with one side of the inner race of said first bearing structure, radial shoulder means on the hub engaging the opposite side of the inner race of said second bearing structure and confining the bearing structures and spacer against the first radial shoulder, said radial shoulder means being removable and the outer end of the hub remote from the first radial shoulder being of such diameter that the bearing structures and spacer may be axially moved on the hub over the end of the hub, and removable thrust-receiving means on the support extending partially across the aperture and engaging an outer race for retaining the head and bearing structures in fixed axial position relative to the support, said aperture being unobstructed and of no less diameter than the maximum diameter of said bearing structures whereby the assembly of head, bearing structures, and spacer may be removed axially from the aperture.

3. The invention as set forth in claim 2 wherein said radial shoulder means comprises a groove on the hub and a snap ring in the groove.

4. The invention as set forth in claim 2 wherein said thrust-receiving means includes a radial member movably mounted in the support and operatively accessible from the outside of the support when the entire head is mounted thereon, said member operatively engaging the assembly of head and bearing structures at a point between the bearing structures and serving to releasably prevent removal of the assembly from the support.

5. The invention set forth in claim 4 wherein said spacer is of less outer diameter than the outer race of the bearing structure remote from the first radial shoulder to expose a radial face on the side of the race nearer to the first radial shoulder and said radial member engages said radial face.

6. The invention set forth in claim 2 wherein said thrust receiving means includes a groove in the wall of the aperture in said support and a snap ring in said groove and the assembly of head and bearing structures bottoms on and is supported in the aperture by said snap ring.

LEE E. TORREY.

REFERENCES CITED

The following references are of record in the file of this patent:

UNITED STATES PATENTS

| Number | Name | Date |
|---|---|---|
| 1,673,398 | Coulter | June 12, 1928 |
| 1,797,736 | Swincoe et al. | Mar. 24, 1931 |
| 1,887,405 | Fogle | Nov. 8, 1932 |
| 2,154,745 | Hedgpeth | Apr. 18, 1939 |
| 2,262,512 | Musselman | Nov. 11, 1941 |
| 2,360,921 | Wiken | Oct. 24, 1944 |